Figure 1:
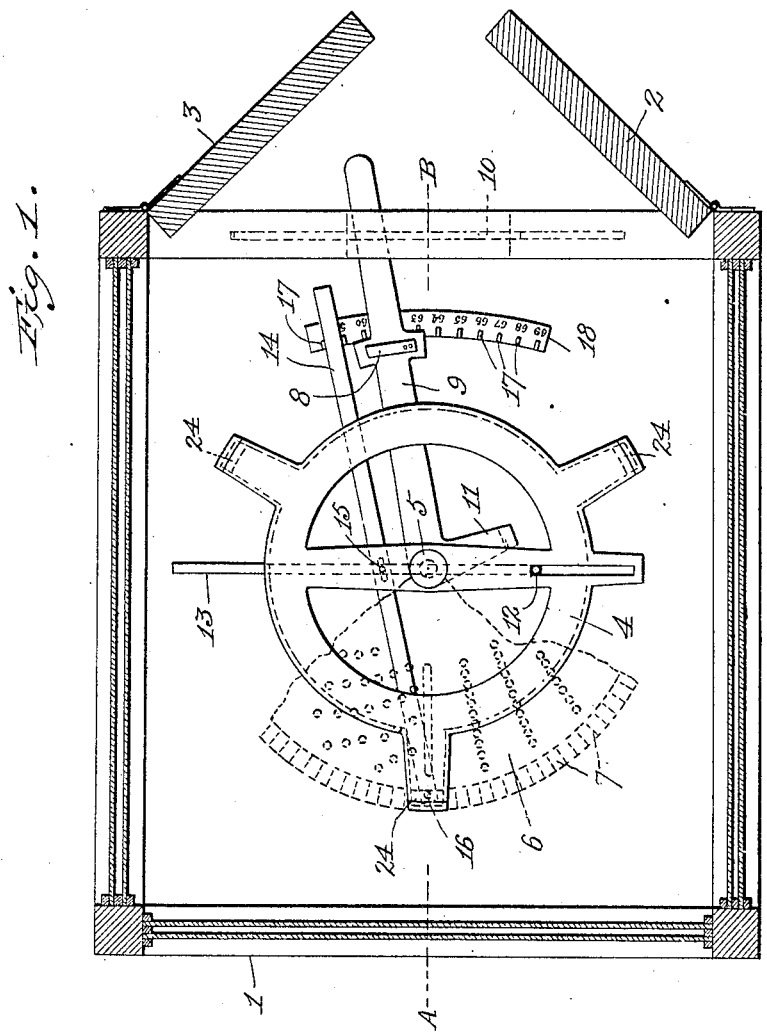

No. 875,739. PATENTED JAN. 7, 1908.
C. E. & O. W. ROBERTS.
MACHINE FOR CUTTING BUTTER, &c.
APPLICATION FILED MAR. 27, 1907.

2 SHEETS—SHEET 1.

Witnesses
Edwin L. Jewell
J. H. Holt

Inventors
Charles E. Roberts,
Owen W. Roberts
By W. Schoenborn
Attorney

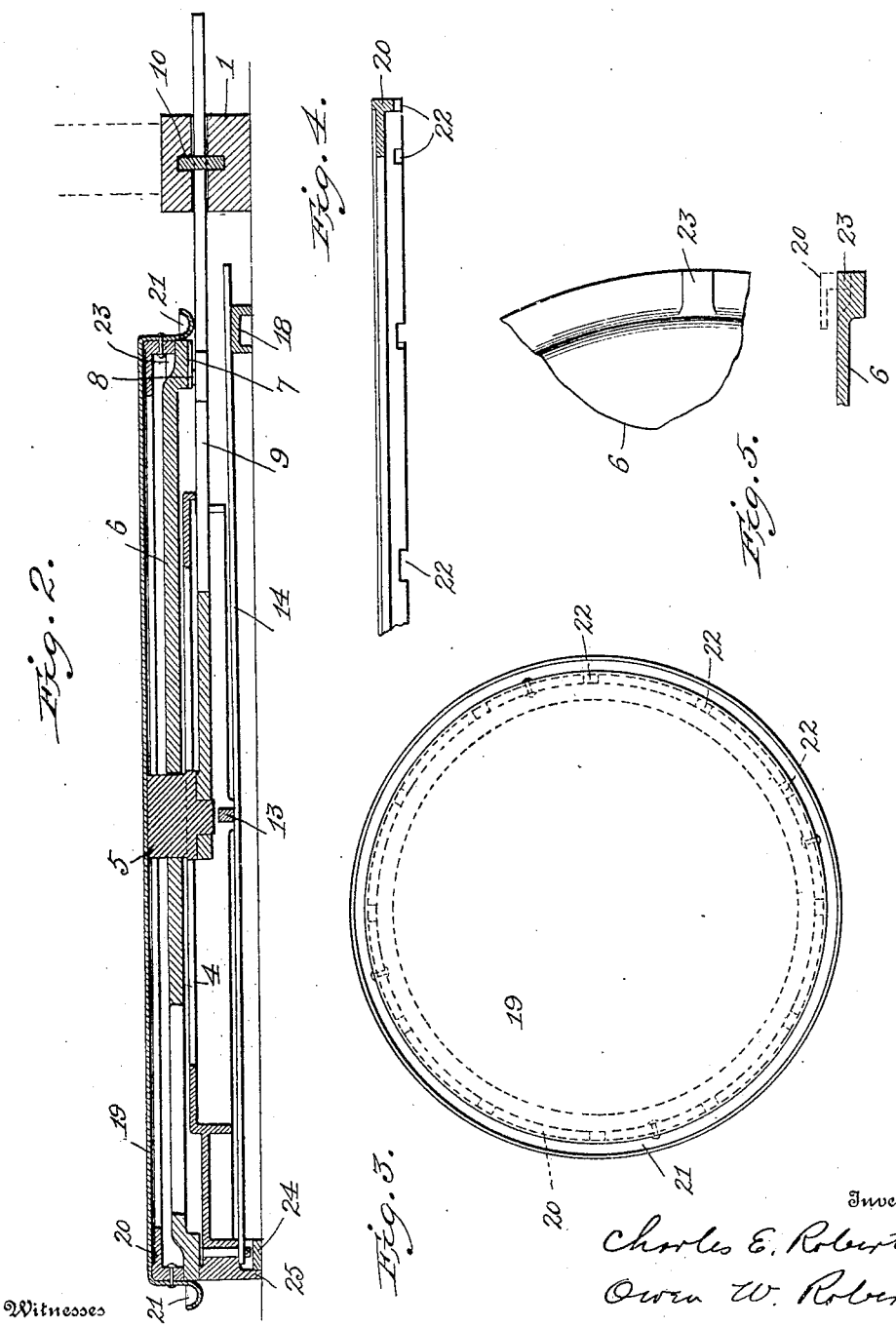

UNITED STATES PATENT OFFICE.

CHARLES E. ROBERTS AND OWEN W. ROBERTS, OF CHICAGO, ILLINOIS.

MACHINE FOR CUTTING BUTTER, &c.

No. 875,739.

Specification of Letters Patent.

Patented Jan. 7, 1908.

Application filed March 27, 1907. Serial No. 364,863.

*To all whom it may concern:*

Be it known that we, CHARLES E. ROBERTS and OWEN W. ROBERTS, citizens of the United States, residing at Chicago, in the county of Cook and State of Illinois, have invented certain new and useful Improvements in Machines for Cutting Butter or the Like Material, of which the following is a specification.
Our invention relates to butter cutting apparatus of the general type set forth in the patent to Carter No. 813,858, Feb. 27, 1906, and also in our co-pending application Serial No. 359,432, filed February 26, 1907.
The present embodiment like that disclosed in said copending application is designed for use within an inclosing casing which may be a display case or a refrigerator.

Our invention in the present case consists in an improved arrangement of the turn table or rotatable index plate for carrying the butter, relative to the inclosing casing.

Referring to the accompanying drawings, Figure 1, is a horizontal section through a suitable casing showing the base with index plate and operating devices therefor in plan; the mounting for the cutter knife may be similar to our co-pending application above referred to but is omitted since nothing novel is claimed in the present instance relative thereto; Fig. 2, is a vertical section on the line A—B, Fig. 1, showing the butter pan and pan supporting ring in place on the index plate; Fig. 3, is a plan view of the pan with the supporting ring therefor attached; Fig. 4, is a detail view of the pan supporting ring; Fig. 5, is a detail showing one of the projections on the index plate for holding the butter pan in place.
1 is a suitable inclosing casing having doors 2 and 3; the former may carry the dividing plate and operating lever as in our application above referred to, while the latter may be of smaller size and arranged for the taking out of the several pieces of butter therethrough. The base 4 has a pivot 5 to support the index plate 6 thereon for rotation and suitable peripheral supporting lugs extending upward from said base may be provided to sustain and guide the circumference of the index plate in its rotation.

The index plate 6 is mounted and operated similarly to that in the above mentioned application, it being provided with a series of ratchet teeth 7 disposed about the circumference thereof and adapted to be engaged by a spring pawl 8 on the index lever 19. Said index lever is journaled about the pivot 5 and may extend through a suitable slot therefor in the casing. Said slot is preferably kept closed by a sliding member 10 arranged to move with the lever and to extend into suitable recesses in the casing. The lever 9 is further provided with a lateral extension 11 adapted to serve as a cam to withdraw the index pin 12 from engagement with one of the holes in the index plate. The index pin 12 has a lateral extension 13 arranged to slide through a suitable guiding aperture in the base, said extension being pivoted intermediate its length at a point 15 to the weight lever 14. Said weight lever is fulcrumed at 16 and extends to a point in the front of the casing where it is adapted to engage one of a series of spaced openings between projections 17 on a weight gage segment 18. Said gage is graduated adjacent said spaces with a series of numbers indicating the weight of the cakes of butter of commerce and each corresponding to one of the circular series of holes in the index plate.

The butter pan 19 is secured by suitable bolts or otherwise to a flanged ring 20, and may have depending therefrom an annular drip channel 21. The ring 20 and pan are removably positioned upon the index plate 6 by means of suitable notches 22 in said ring arranged to coöperate with similarly spaced projections 23 on the index plate.

It will be apparent that it is a matter of importance that the several parts of the apparatus be placed exactly relative to each other and to this end a series of pieces 24,—3 being shown,—are fixed to the bottom of the casing and arranged to coöperate with similarly spaced projecting parts 25 formed on the base of the apparatus.

In operation the index pin 12 is set by manipulation of the weight lever 14 to register with the series of holes in the index plate appropriate for the size of the cake of butter in hand, this being determined by the position of the weight lever on the weight gage 18. The handle 9 which, in its initial position, has its cam 11 so positioned as to hold the pin 12 disengaged is manipulated and its spring pawl 8 engages a ratchet tooth on the index plate and imparts rotation to said plate. As the lever 9 is thus moved its cam 11 is likewise moved away from engagement with the extension 13 of index pin 12 and said pin will therefore snap into the first hole in the index plate of the series for which it is adjusted. The sector of the butter cake which is thus passed under the cutter is of the desired dimension for retailing. As above noted the butter cutter element used in connection with our improved device is fully described in the patent and application referred to and since the same is not claimed herein, illustration or description thereof is thought unnecessary.

It will be observed that the base 4 with the index plate 6 and operating devices therefor are secured to the bottom of the casing chamber and that the butter pan 19 with its ring 20 is removably disposed thereon. To place a cake of butter upon the apparatus the pan is first placed on the tub, the tub inverted and taken off the butter and then the pan with the cake of butter thereon placed upon the index plate and properly positioned thereon by causing the interengagement of notches 22 and projections 23 on the ring and index plate respectively.

Having thus described the invention what we claim as new and desire to secure by Letters Patent is as follows:—

1. A butter cutting apparatus comprising an inclosing casing, means for fixing a supporting base in position therein, a supporting base, a rotatable index plate thereon, and a removable butter pan adapted to be positioned on said index plate.

2. A butter cutting apparatus comprising a casing, a base member therein, interengaging parts on said casing and base for holding said elements in fixed relation, an index plate pivoted and supported on said base, means for rotating said index plate, and a removable pan arranged to be positioned on said index plate.

3. A butter cutting apparatus comprising a casing, a base arranged therein, similarly spaced engaging members on said casing and base to determine the location of said base, an index plate pivoted on said base, an index lever also pivoted to said base, and constructed to operate said plate, a portion of said lever extending without the casing, a butter pan removably secured to said index plate, and means for determining the position of said butter pan on said index plate.

4. A butter cutting apparatus comprising a casing, a base positioned therein, means for fixing the location of said base in said casing, an index plate pivoted to said base, means for rotating said index plate, a butter pan, an annulus secured thereto, and coöperating means on said annulus and index plate for determining the position of said ring and pan on said index plate.

5. A butter cutting apparatus comprising a casing, a base therein, interchanging lugs and flanges on said casing and base respectively to determine the position of the base, an index plate on said base having peripheral projections thereon, a removable butter pan, a ring secured thereto at its circumference, said ring having notches spaced to receive the projections on said index plate to position the same thereon.

6. A butter cutting apparatus comprising a casing, an indexing butter support therein, the same consisting of a base, and index plate pivoted thereto, a butter pan removably secured to said index plate and means for placing the same in a determinate position on said index plate.

7. A butter cutting apparatus comprising a casing, an indexing butter support therein, means for rotating said butter support said means including an element extending without the casing, said casing having an extended slot to receive said element and means for keeping said slot closed while permitting movement of said element therein.

8. An apparatus of the class described comprising a casing, a butter cutting apparatus therein, means for operating said apparatus, said means extending without the casing, a door in said casing, and an additional door therein, the latter being arranged for the convenient removal of the several pieces of butter therethrough.

9. An apparatus of the class described comprising an inclosing casing, a base fixed therein, an indexing plate on said base, means for variably rotating said plate predetermined amounts, said plate having peripheral projections, a flanged ring having recesses adapted to register with said projections and a butter pan secured to said ring, the butter pan and ring being thus removably positioned upon the index plate.

10. An apparatus of the class described, comprising an inclosing casing, lugs fixed to the bottom thereof, a base having lugs, arranged to interengage with those of the casing to position the base, an index plate pivoted and guided on said base, means for rotating said index plate predetermined amounts, said means including a handle extending without the casing through an extended slot therein, means for keeping said slot closed in all positions of said handle, a removable pan and means for positioning the same upon said index plate.

In testimony whereof we affix our signatures in presence of two witnesses.

CHARLES E. ROBERTS.
OWEN W. ROBERTS.

Witnesses:
H. J. WINSTEN,
GEO. P. HENRY.